(12) United States Patent
Ljolje et al.

(10) Patent No.: US 8,589,163 B2
(45) Date of Patent: Nov. 19, 2013

(54) ADAPTING LANGUAGE MODELS WITH A BIT MASK FOR A SUBSET OF RELATED WORDS

(75) Inventors: Andrej Ljolje, Morris Plains, NJ (US); Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 522 days.

(21) Appl. No.: 12/631,111

(22) Filed: Dec. 4, 2009

(65) Prior Publication Data

US 2011/0137653 A1    Jun. 9, 2011

(51) Int. Cl.
  *G10L 15/06*   (2013.01)
  *G10L 15/12*   (2006.01)
  *G10L 15/22*   (2006.01)

(52) U.S. Cl.
  USPC ............................ 704/255; 704/242; 704/244

(58) Field of Classification Search
  USPC ......... 704/235, 236, 243, 244, 251, 255, 252, 704/257, 242
  See application file for complete search history.

(56) References Cited

U.S. PATENT DOCUMENTS

| | | | | | |
|---|---|---|---|---|---|
| 5,758,319 | A  * | 5/1998  | Knittle   | ........................... | 704/251 |
| 5,802,251 | A  * | 9/1998  | Cohen et al. | ................... | 704/275 |
| 5,825,921 | A  * | 10/1998 | Dulong | ........................ | 382/181 |
| 5,881,312 | A  * | 3/1999  | Dulong | ............................ | 710/7 |
| 6,370,505 | B1 * | 4/2002  | Odell | ........................... | 704/256 |
| 6,418,431 | B1 * | 7/2002  | Mahajan et al. | ............... | 704/257 |
| 6,571,209 | B1 * | 5/2003  | Cohen et al. | ................... | 704/251 |
| 6,687,689 | B1 * | 2/2004  | Fung et al. | | |
| 7,072,838 | B1 * | 7/2006  | Ghosh et al. | ................... | 704/257 |
| 7,171,358 | B2 * | 1/2007  | Whittaker et al. | ............ | 704/243 |
| 7,533,020 | B2 * | 5/2009  | Arnold et al. | ................. | 704/257 |
| 7,974,844 | B2 * | 7/2011  | Sumita | .......................... | 704/257 |
| 8,050,923 | B2 * | 11/2011 | Blair | ............................ | 704/251 |
| 8,108,207 | B1 * | 1/2012  | Harvey et al. | ..................... | 704/9 |
| 8,301,450 | B2 * | 10/2012 | Lee et al. | ....................... | 704/257 |
| 2002/0087311 | A1 * | 7/2002  | Leung Lee et al. | ........... | 704/251 |
| 2005/0010411 | A1 * | 1/2005  | Rigazio et al. | ................ | 704/246 |
| 2005/0182628 | A1 * | 8/2005  | Choi | .............................. | 704/252 |
| 2005/0234723 | A1 * | 10/2005 | Arnold et al. | ................. | 704/257 |
| 2007/0100618 | A1 * | 5/2007  | Lee et al. | ....................... | 704/238 |
| 2008/0130699 | A1 * | 6/2008  | Ma et al. | ..................... | 372/50.12 |
| 2011/0077942 | A1 * | 3/2011  | Ljolje et al. | .................... | 704/244 |
| 2011/0093265 | A1 * | 4/2011  | Stent et al. | ..................... | 704/243 |
| 2011/0296374 | A1 * | 12/2011 | Wu et al. | ........................ | 717/104 |

* cited by examiner

*Primary Examiner* — Martin Lerner

(57) ABSTRACT

Disclosed herein are systems, methods, and computer-readable storage media for performing speech recognition based on a masked language model. A system configured to practice the method receives a masked language model including a plurality of words, wherein a bit mask identifies whether each of the plurality of words is allowed or disallowed with regard to an adaptation subset, receives input speech, generates a speech recognition lattice based on the received input speech using the masked language model, removes from the generated lattice words identified as disallowed by the bit mask for the adaptation subset, and recognizes the received speech based on the lattice. Alternatively during the generation step, the system can only add words indicated as allowed by the bit mask. The bit mask can be separate from or incorporated as part of the masked language model. The system can dynamically update the adaptation subset and bit mask.

20 Claims, 5 Drawing Sheets

FIG. 3B

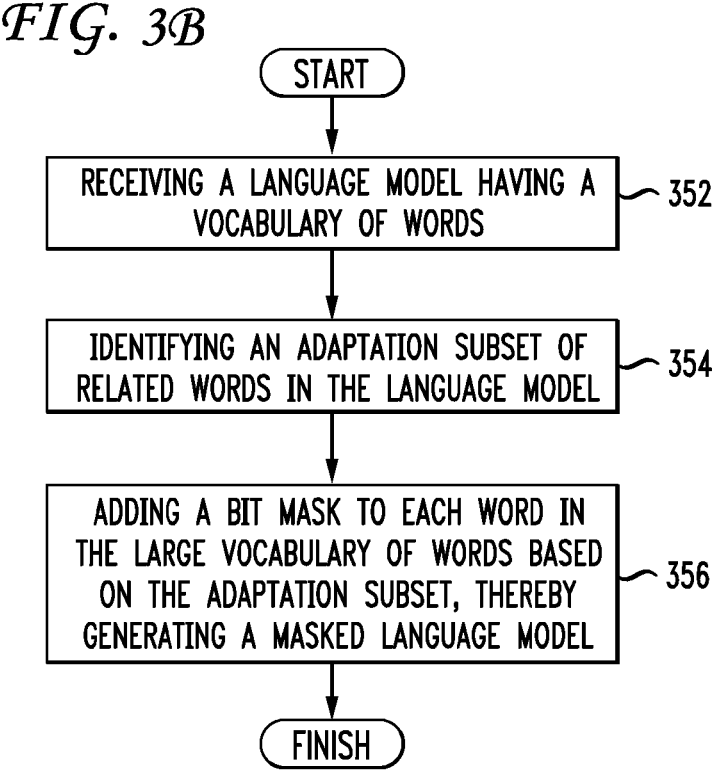

```
START
  ↓
RECEIVING A LANGUAGE MODEL HAVING A VOCABULARY OF WORDS — 352
  ↓
IDENTIFYING AN ADAPTATION SUBSET OF RELATED WORDS IN THE LANGUAGE MODEL — 354
  ↓
ADDING A BIT MASK TO EACH WORD IN THE LARGE VOCABULARY OF WORDS BASED ON THE ADAPTATION SUBSET, THEREBY GENERATING A MASKED LANGUAGE MODEL — 356
  ↓
FINISH
```

FIG. 4

| 402 | 404 | 406 | 408 | 410 | 412 |
|---|---|---|---|---|---|
| LEDO'S | 1 | 0 | 1 | 1 | 1 |
| MAMA LUCIA'S | 1 | 0 | 1 | 1 | 1 |
| BLOCKBUSTER | 0 | 0 | 0 | 1 | 0 |
| WALMART | 0 | 1 | 1 | 1 | 1 |
| SNEADE'S | 0 | 1 | 0 | 1 | 0 |
| CICI'S | 1 | 0 | 0 | 1 | 1 |
| SAFEWAY | 0 | 0 | 1 | 1 | 1 |
| RITA'S | 1 | 0 | 1 | 1 | 1 |
| GIANT | 0 | 0 | 1 | 1 | 1 |
| ⋮ | ⋮ | ⋮ | ⋮ | ⋮ | ⋮ |

ADAPTING LANGUAGE MODELS WITH A BIT MASK FOR A SUBSET OF RELATED WORDS

BACKGROUND

1. Technical Field

The present disclosure relates to speech recognition and more specifically to masking words in a speech recognition language model.

2. Introduction

Speech recognition systems, such as those used for a nationwide business directory, typically rely on language models which are extremely large and can include millions of business names, street names, people names, and all addresses in the country. Such language models have poor discrimination properties, allowing too many alternative recognition outputs. One prior art approach creates smaller language models for a number of particular geographical areas, for example, but this approach can lead to consistency problems when some of the areas overlap or when a particular entry is updated in one language model but not in another. Further, it is not possible in practice to support more than one large language model because the computational expense of searching through more than one large language model quickly becomes prohibitive.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3B illustrates a second example method embodiment;

FIG. 4 illustrates a sample bit masked language model;

DETAILED DESCRIPTION

Many speech recognition applications are open-ended and thus have enormous vocabularies which result in very large, but poorly discriminating language models. One way to improve such language models (like business search for Yellow Pages for the whole USA) is to use a reduced word list (words that are in the language model) which reflects adaptation to a particular geographical area, the speaker's past usage patterns, or any other category that reduces the perplexity of the language model. In the approach disclosed herein, the language model remains the same, but the system only uses the words that occur in that adaptation subset in the recognition output. The system can achieve this in different ways. For example, the system can create one or more bitmaps of the wordlist with the accepted words' bits set to 1, and the rest set to 0. During the recognition, the system terminates decoding any path that goes through a word that has been disallowed, i.e. set to 0. Alternatively, a recognizer can output a lattice, and the system can remove all the disallowed words so that the best remaining path is the recognition output.

The solution presented herein does not modify the language model itself, nor the typical speech recognition search network. That approach would be both too slow and would require too much memory to support both the initial and the alternative versions of the network. The approach disclosed herein limits the scope of the wordlist matching the language model. It either allows or disallows words in order to effectively create subsets of the language model which are typically much smaller. For the preserved words, the language model is identical in terms of allowed word sequences and their probabilities. This approach decreases the number of allowed paths. In addition, this approach is computationally extremely cheap if done during the decoding and only marginally more expensive if the system generates a word lattice instead of just providing the best utterance as the result of recognition. Many situations already require a lattice, in which case this technique would not appreciably increase the computational load. If a recognition lattice output is available, then the system can easily remove the disallowed words and find the best remaining word string.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
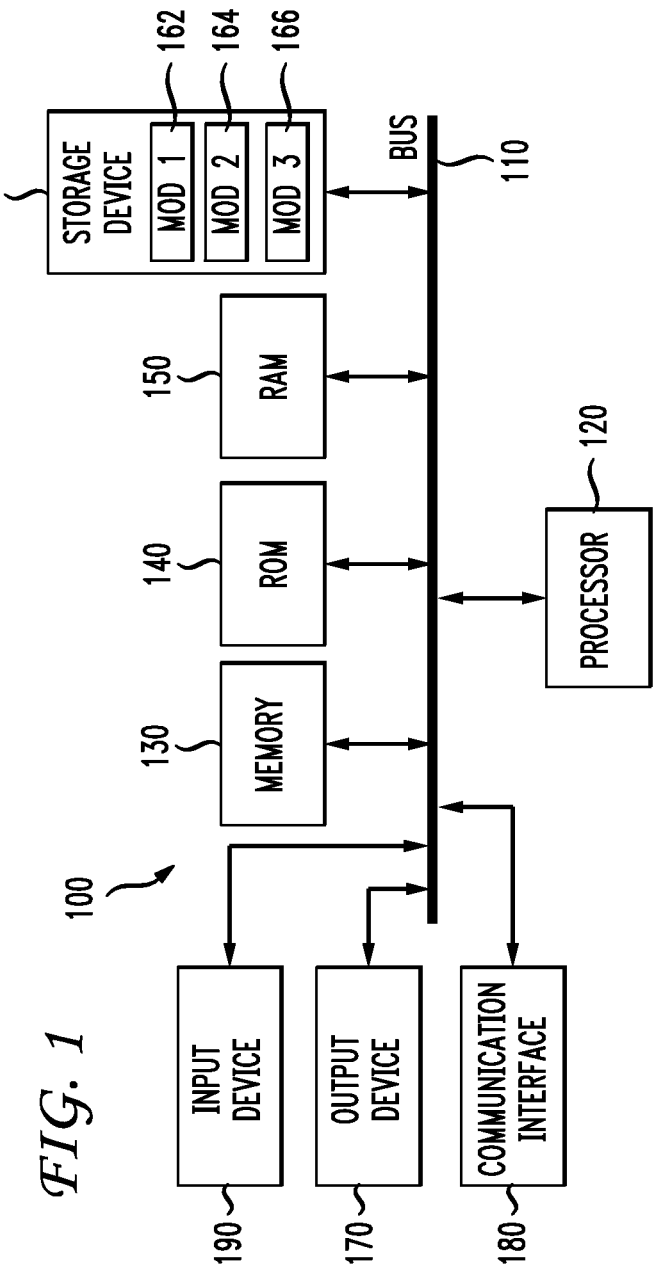
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
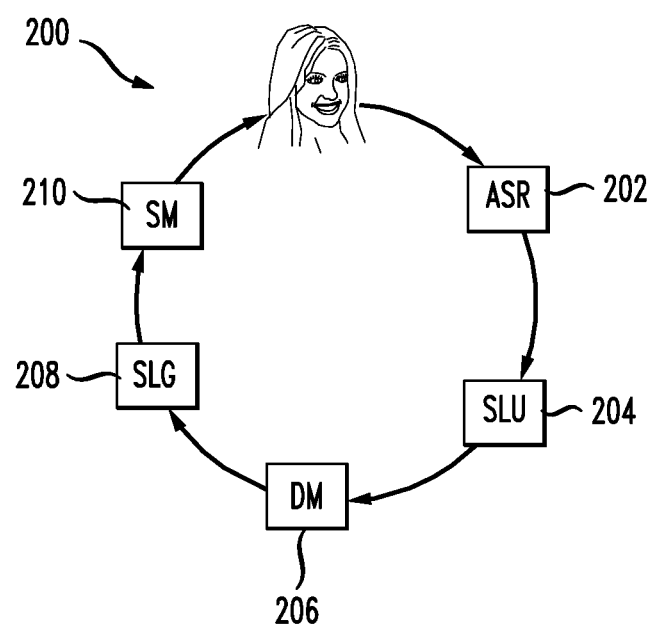
FIG. 2 illustrates a functional block diagram of an exemplary natural language spoken dialog system.

FIG. 2 illustrates a functional block diagram of an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module using a masked language model can join the system at any point or at multiple points in the cycle or can be integrated with any of the modules shown in FIG. 2.

Figure 3A:
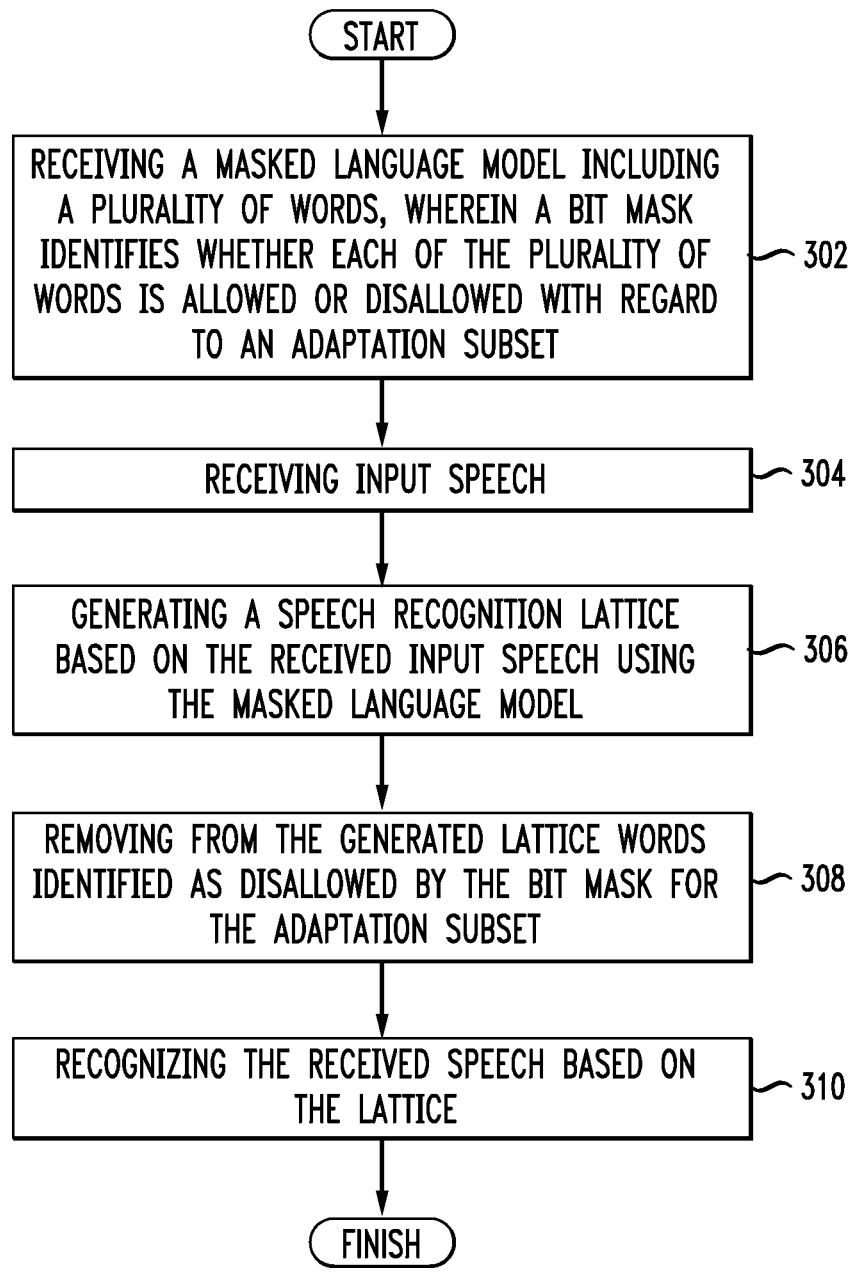
FIG. 3A illustrates a first example method embodiment.

Having disclosed some basic system and spoken dialog components, the disclosure now turns to the exemplary method embodiment shown in FIG. 3. For the sake of clarity, the method is discussed in terms of an exemplary system 100 such as is shown in FIG. 1 configured to practice the method.

The system 100 receives a masked language model including a plurality of words, wherein a bit mask identifies whether each of the plurality of words is allowed or disallowed with regard to an adaptation subset (302) and receives input speech (304). The bit mask can be incorporated as part of the masked language model and/or can be a separately stored, but associated resource. The adaptation subset and/or bit mask can be associated with a user profile or a class of users. In one aspect, the system 100 includes a mechanism to enable and disable one or more bit mask partially or in its entirety. The system 100 can even combine two or more bit masks through a Boolean operation such as AND, OR, XOR, NOR, XNOR, etc. The combination approach can be useful in a business directory search over two neighboring, but differently masked, cities, for example. The system 100 can combine the bit mask for each city using OR to allow entries from each.

The system 100 generates a speech recognition lattice based on the received input speech using the masked language model (306) and removes from the generated lattice words identified as disallowed by the bit mask for the adaptation subset (308). The system 100 then recognizes the received speech based on the lattice (310). The system 100 can update the adaptation subset and bit mask based on usage history.

In one aspect, the system 100 generates the masked language model by receiving a language model having a vocabulary of words, identifying an adaptation subset of related words in the language model, and adding a bit mask to each word in the large vocabulary of words based on the adaptation subset. The system 100 can further identify a plurality of adaptation subsets and add a separate bit mask to each word in the large vocabulary of words corresponding to each of the plurality of adaptation subsets. Adaptation subsets of related words can be based on a geographical relationship, a speaker usage pattern, business category, and/or other similarities or characteristics. The system 100 can dynamically generate the adaptation subset and associated bit mask from a search query. In one aspect, the system combines existing adaptation subsets with dynamically generated subsets. For example, a user searches for restaurants in Utah, but gets too many results. Based on additional user input, the system 100 can generate a dynamic adaptation subset and bit mask from the initial adaptation subset which more closely matches the user's intent.

FIG. 3B illustrates a second exemplary method embodiment for generating a masked language model. In this embodiment, the system 100 receives a language model having a vocabulary of words (352) and identifies an adaptation subset of related words in the language model (354). The system 100 then adds a bit mask to each word in the large vocabulary of words based on the adaptation subset, thereby generating a masked language model (356).

FIG. 4 illustrates a sample bit masked language model 400. In this model 400, the leftmost column 402 includes the words in the language model, such as Ledo's, Mama Lucia's, Blockbuster, and so forth. The words in this language model are drawn from an exemplary business directory search application. To the right of the words 402, the language model 400 includes multiple columns 404, 406, 408, 410, 412 of mask information. FIG. 4 illustrates masks of a single bit having a value of one or zero. Either one or zero can indicate that the mask allows the associated word in the language model. In this example, column 404 represents a mask for an adaptation subset of "restaurants." Ledo's and Mama Lucia's have a 1 in that column because they are restaurants, but Blockbuster and Walmart have a 0 in that column. Similarly the remaining columns represent adaptation subsets such as "home improvement" 406, a particular town 408, a particular state 410, and "food retailer or restaurant" 412. The language model can include additional masks with very small additional storage space.

This approach allows very inexpensive adaptation of very large language models based on any number of adaptation scenarios. However, the system can establish a number of masks associated with adaptation subsets that is a power of two (i.e. 2, 4, 8, 16, 32, etc.) in order to more easily address and store the masks in a binary computer. This improvement is transparent to the user, requires no increase in recognition time (in fact it can speed up recognition because a large number of paths can be disallowed), does not increase latency, and needs only a marginal increase in memory usage. In one concrete example of a 1 gigabyte language model having a wordlist of 250,000 words, the system 100 adds 128 bit masks, one per category (which could be states, or age groups, or interest groups, etc.), to the model. The additional memory is 250,000*128 bits or just under 4 megabytes, which is just a 0.003725% size increase over the original search network language model.

Because the additional memory or storage requirements are so minimal, the system can easily incorporate numerous masks and even masks having more than a single bit. For example, the mask for each adaptation subset can be multiple bits. In these cases, the system 100 can determine that any non-zero value is allowed and zero values are disallowed, or the system 100 can use intermediate values as represented by the multiple bits to perform more sophisticated calculations based on likelihood, weight, or threshold values. For example, the system 100 can completely disallow words masked by a value of 0, and modify the weights of other words in the speech recognizer output lattice based on their mask value. In other cases, the system 100 can allow words having a value equal to or greater than a given threshold and disallow words below that threshold. Further, the system 100 can refine the mask values based on user interactions and/or feedback.

Figure 5A:
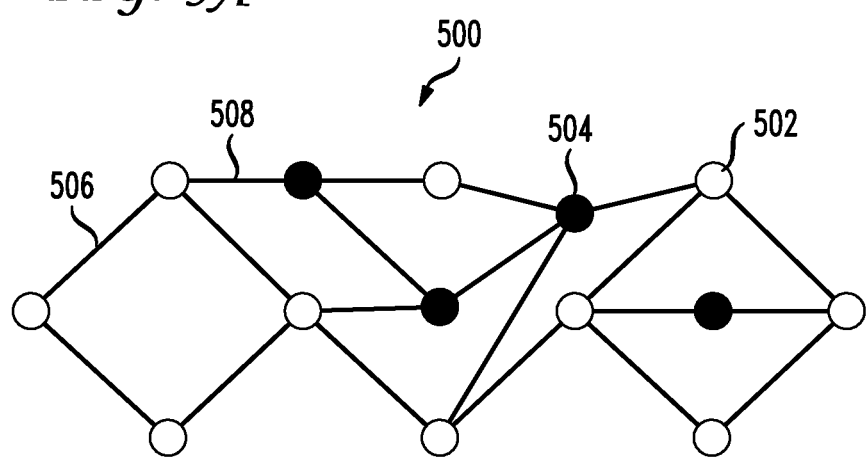
FIG. 5A illustrates a sample recognition lattice before removing disallowed nodes.
Figure 5B:
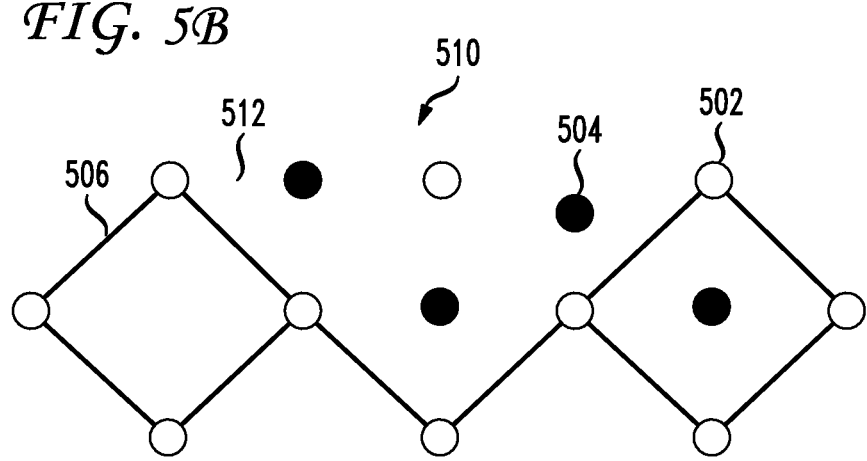
FIG. 5B illustrates a sample recognition lattice after removing disallowed nodes.

FIG. 5A illustrates a sample recognition lattice 500 before removing disallowed nodes. The lattice 500 is made up of white nodes 502 and black nodes 504 interconnected by edges 506, 508. A speech recognizer can output a lattice 500 of connected words based on recognition with a language model. In the lattice, the white nodes 502 indicate that the mask allows the word for a given adaptation subset, and the black nodes 504 indicate that the mask disallows the word for the given adaptation subset. The system 100 can refer to a database with mask bits such as the one illustrated in FIG. 4 to determine which nodes are masked. In one aspect, the system generates a complete lattice with all the nodes, masked and unmasked, and then removes the nodes and/or edges which are at least partially masked. In another aspect, the system 100 prevents masked nodes and/or edges from being added when generating the lattice. Some edges 506 connect white nodes only, while other edges 508 connect with at least one black node. FIG. 5B illustrates a sample recognition lattice 510 after removing disallowed nodes. In FIG. 5B, the system 100 has removed paths 512 connecting at least one black node 504, while leaving edges 506 that connect white nodes only, so that the best remaining path through the unmasked white nodes is the recognition output. The resulting lattice 510 is much simpler than the original lattice 500 because the system removed the masked edges.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to speech as well as non-speech applications such as a movie search, nationwide yellow page search, or an employee directory. Those skilled in the art will readily recognize various modifications and changes that may be made to the principles described herein without following the example embodiments and applications illustrated and described herein, and without departing from the spirit and scope of the disclosure.

We claim:

1. A computer-readable storage device having instructions stored which, when executed by a processor, cause the processor to perform operations comprising:

receiving, via the processor, a language model having a vocabulary of words, the language model comprising a speech recognizer output lattice;

receiving a user query;

identifying, via the processor, an adaptation subset of related words in the vocabulary of words in the language model based on the user query;

adding a geographically-specific bit mask to each word in the vocabulary of words based on the adaptation subset, thereby generating a masked language model; and modifying weights of other words in the speech recognizer output lattice based on the masked language model.

2. The computer-readable storage device of claim 1, the computer-readable storage device having additional instructions stored which result in the operations further comprising:

identifying a plurality of adaptation subsets based on the user query; and adding a separate bit mask to each word in the vocabulary of words corresponding to each of the plurality of adaptation subsets.

3. The computer-readable storage device of claim 2, wherein the plurality of adaptation subsets is a multiple of a power of two.

4. The computer-readable storage device of claim 1, wherein the identifying of the adaptation subset of related words is based on a geographical relationship.

5. The computer-readable storage device of claim 1, wherein the identifying of the adaptation subset of related words is based on one of a speaker usage pattern and a business category.

6. The computer-readable storage device of claim 1, wherein a speech recognition application allows only words in the language model having a matching bit mask value for a given adaptation subset.

7. The computer-readable storage device of claim 1, wherein the geographically-specific bit mask comprises, for each word in the vocabulary, one of a 1 and a 0.

8. A system comprising:

a processor; and a computer-readable storage medium having instructions stored which, when executed by the processor, cause the processor to perform operations comprising:

receiving, via the processor, a language model having a vocabulary of words, the language model comprising a speech recognizer output lattice;

receiving a user query;

identifying, via the processor, an adaptation subset of related words in the vocabulary of words in the language model based on the user query;

adding a geographically-specific bit mask to each word in the vocabulary of words based on the adaptation subset, thereby generating a masked language model; and modifying weights of other words in the speech recognizer output lattice based on the masked language model.

9. The system of claim 8, the computer-readable storage medium having additional instructions stored which result in the operations further comprising:

identifying a plurality of adaption subsets based on the user query; and adding a separate dynamically generated bit mask to each word in the vocabulary of words corresponding to each of the plurality of adaption subsets.

10. The system of claim 8, wherein the geographically-specific bit mask is separate from, but associated with, the masked language model.

11. The system of claim 8, the computer-readable storage medium having additional instructions stored which result in the operations further comprising updating the adaptation subset and the geographically-specific bit mask based on a usage history.

12. The system of claim 8, wherein the adaptation subset and the geographically-specific bit mask are associated with a user profile.

13. The system of claim 8, the computer-readable storage medium having additional instructions stored which result in the operations further comprising enabling and disabling the geographically-specific bit mask.

14. The system of claim 8, wherein the geographically-specific bit mask comprises, for each of the plurality of words, one of a 1 and a 0.

15. A method comprising:
receiving, via the processor, a language model having a vocabulary of words, the language model comprising a speech recognizer output lattice;
receiving a user query;
identifying, via the processor, an adaptation subset of related words in the vocabulary of words in the language model based on the user query;
adding a geographically-specific bit mask to each word in the vocabulary of words based on the adaptation subset, thereby generating a masked language model; and
modifying weights of other words in the speech recognizer output lattice based on the masked language model.

16. The method of claim 15, further comprising:
identifying a plurality of adaptation subsets based on the user query; and
adding a separate bit mask to each word in the vocabulary of words corresponding to each of the plurality of adaptation subsets.

17. The method of claim 15, the method further comprising dynamically generating the adaptation subset and the geographically-specific bit mask.

18. The method of claim 15, wherein identifying the adaptation subset of related words is based on a geographical relationship.

19. The method of claim 15, wherein a speech recognition application allows only words in the language model having a matching bit mask value for a given adaptation subset.

20. The method of claim 15, wherein a speech recognition application allows only words in the language model having a matching bit mask value for each of a plurality of given adaptation subsets.

* * * * *